US010015783B2

(12) United States Patent
Yin et al.

(10) Patent No.: US 10,015,783 B2
(45) Date of Patent: Jul. 3, 2018

(54) METHOD AND APPARATUS FOR SIGNALLING TO DOWNLINK TRANSMISSION FOR UNLICENSED CHANNELS IN A WIRELESS COMMUNICATION SYSTEM

(71) Applicant: ASUSTeK Computer Inc., Taipei (TW)

(72) Inventors: Wei-Ming Yin, Taipei (TW); Li-Chih Tseng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 112 days.

(21) Appl. No.: 15/347,282

(22) Filed: Nov. 9, 2016

(65) Prior Publication Data
US 2017/0142693 A1    May 18, 2017

Related U.S. Application Data

(60) Provisional application No. 62/255,746, filed on Nov. 16, 2015.

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1893* (2013.01); *H04L 5/0007* (2013.01); *H04W 16/14* (2013.01)

(58) Field of Classification Search
None
See application file for complete search history.

(56) References Cited

U.S. PATENT DOCUMENTS

2017/0332379 A1* 11/2017 Wang ............... H04W 72/0453
2017/0353866 A1* 12/2017 Gou ..................... H04W 16/14

OTHER PUBLICATIONS

Intel Corporation: "On the LAA DL Signaling", 3GPP DRAFT; R1-156516, 3rd Generation Partnership Project (3GPP), Mobile Competence Centre ; 650, Route Des Lucioles ; F-06921 Sophia-Antipolis Cedex ;France,vol. RAN WG1, no. XP051039874.

(Continued)

*Primary Examiner* — Anh Ngoc M Nguyen
(74) *Attorney, Agent, or Firm* — Blue Capital Law Firm, P.C.

(57) ABSTRACT

Methods and apparatuses for implementing reference signal transmissions in a wireless communication system. According to one method, the UE receives a downlink transmission burst from a base station in a first unlicensed channel. The UE also receives an information in a second channel, wherein the information defines whether a subframe is an end subframe of the downlink transmission burst in the first unlicensed channel. The UE determines whether or not to receive a control message, data, or a reference signal from a next frame in the first unlicensed channel. The UE receives the control message, data, or the reference signal from the next frame in the first unlicensed channel if the information indicates that the subframe is not the end subframe of the downlink transmission burst. Alternatively, the UE refuses to receive the control message, data, or the reference signal from the next frame in the first unlicensed channel if the information indicates that the subframe is the end subframe of the downlink transmission burst.

19 Claims, 10 Drawing Sheets

(51) Int. Cl.
  *H04L 1/18* (2006.01)
  *H04W 16/14* (2009.01)

(56) References Cited

OTHER PUBLICATIONS

NTT DOCOMO et al: "Discussion on L1 signaling design for LAA", 3GPP DRAFT; R1-157224 Discussion on L1 Signaling Design_Final, 3rd Generation Partnership Project (3GPP), Mobile Competence Centre ; 650, Route Des Lucioles ; F-06921 Sophia-Antipolis Cedex ;France vol. RAN WG1, no. Anaheim, USA; Nov. 15, 2015-Nov. 22, 2015 November 15, 2015 (Nov. 15, 2015), XP051003447.

ZTE "Details of Design on DL frame structure and signaling for LAA", 3GPP Draft; R1-156988 Details of Design on DL Frame Structure and Signaling for LAA, 3rd Generation Partnership Project (3GPP), Mobile Competence Centre ; 650, Route Des Lucioles ; F-06921 Sophia-Anti, vol. RAN WG1, no. Anaheim, USA; Nov. 15, 2015-Nov. 22, 2015 Nov. 7, 2015 (Nov. 7, 2015), XP051042120.

Ericsson: "On signaling in DL LAA subframes" 3GPP DRAFT; R1-157267, 3rd Generation Partnership Project (3GPP), Mobile Competence Centre ; 650, Route Des Lucioles ; F-06921 Sophia-Anti Polis Cedex ;France vol. RAN WG1, no. Anaheim, USA; Nov. 16, 2015-Nov. 20, 2015 Nov. 15, 2015 (Nov. 15, 2015), XP051003475.

European Search Report from corresponding EP Application No. 16197914.1, dated Mar. 31, 2017.

* cited by examiner

| Contents | Length | Examples | Purposes |
|---|---|---|---|
| Ending partial subframe structure | 3 | {3, 6, 7, 9, 10, 11, 12, 14} available OFDM symbols | Rate matching, CSI measurement (based on CRS or periodic CSI-RS/IM) |
| Burst index | 2 or 1 | Burst index of {#0, #1, #2, #3} | CSI measurement averaging |
| Presence of aperiodic CSI-RS/IM | 1 | {present, absent} | CSI measurement based on aperiodic CSI-RS/IM, rate matching |
| CRS structure (if any) | 1 | {1/2 CRS symbol(s), 4/6 CRS symbols} | Synchronization, CSI measurement based on CRS, rate matching |
| Number of subframes that need not to be monitored (if any) | 3 or 2 | {0, 1, 2, 3, 4, 5, 6, 7} subframes | Forward compatibility, UE battery savings |
| CRS/CSI-RS power variation (if any) | 2 | {+9, +6, +3, 0} dB from the configured value | CSI measurement averaging among multiple bursts |
| Presence of DRS (if any) | 1 | {present, absent} | Rate matching |

FIG. 6 (PRIOR ART)

METHOD AND APPARATUS FOR SIGNALLING TO DOWNLINK TRANSMISSION FOR UNLICENSED CHANNELS IN A WIRELESS COMMUNICATION SYSTEM

CROSS-REFERENCE TO RELATED APPLICATIONS

The present application claims the benefit of U.S. Provisional Patent Application Ser. No. 62/255,746 filed on Nov. 16, 2015, the entire disclosure of which is incorporated herein in its entirety by reference.

FIELD

This disclosure generally relates to wireless communication networks, and more particularly, to a method and apparatus for signaling to downlink transmission for unlicensed channels in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses for signaling to downlink transmission for unlicensed channels in a wireless communication system are disclosed herein. The methods disclosed allow for the efficiently determination of whether the current subframe is the end subframe of the ongoing downlink transmission burst because there is no need to wait until Orthogonal Frequency Division Multiplexing (OFDM) symbol#0 at next subframe to determine the subframe validity. Also, the methods disclosed herein improve reliability because the signaling is encoded more reliably. According to one method, the UE receives a downlink transmission burst from a base station in a first unlicensed channel. The UE also receives an information in a second channel, wherein the information defines whether a subframe is an end subframe of the downlink transmission burst in the first unlicensed channel. The UE determines whether or not to receive a control message, data, or a reference signal from a next frame in the first unlicensed channel. The UE receives the control message, data, or the reference signal from the next frame in the first unlicensed channel if the information indicates that the subframe is not the end subframe of the downlink transmission burst. Alternatively, the UE refuses to receive the control message, data, or the reference signal from the next frame in the first unlicensed channel if the information indicates that the subframe is the end subframe of the downlink transmission burst.

BRIEF DESCRIPTION OF THE DRAWINGS

FIG. 6 is a table showing possible content for common signaling.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: RP-151045 "Work Item on Licensed-Assisted Access to Unlicensed Spectrum"; R1-156386 "RAN1 Agreements and Working Assumptions for Rel-13 LAA"; R1-156177 "Way Forward on DL transmission structure in LAA"; R1-156767 "LAA control signaling details"; R1-157224 "Discussion on L1 signaling design for LAA"; R1-156988 "Details of Design on DL frame structure and signaling for LAA"; R1-157169 "Design Considerations of Ending Partial Subframe"; R1-157215 "Further details on UE operation and related signalling for LAA"; R1-157017 "Downlink control signaling in LAA"; R1-157133 "On DL/UL burst and subframe indication for LAA"; and TR36.889 v1.0.1 "Study on Licensed-Assisted Access to Unlicensed Spectrum". The standards and documents listed above are hereby expressly incorporated by reference in their entirety.

Figure 1:
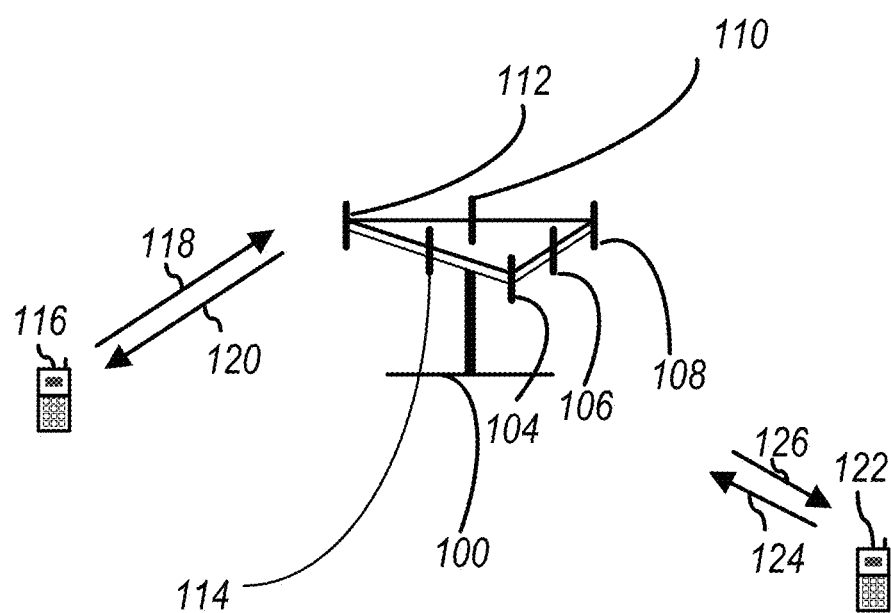
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
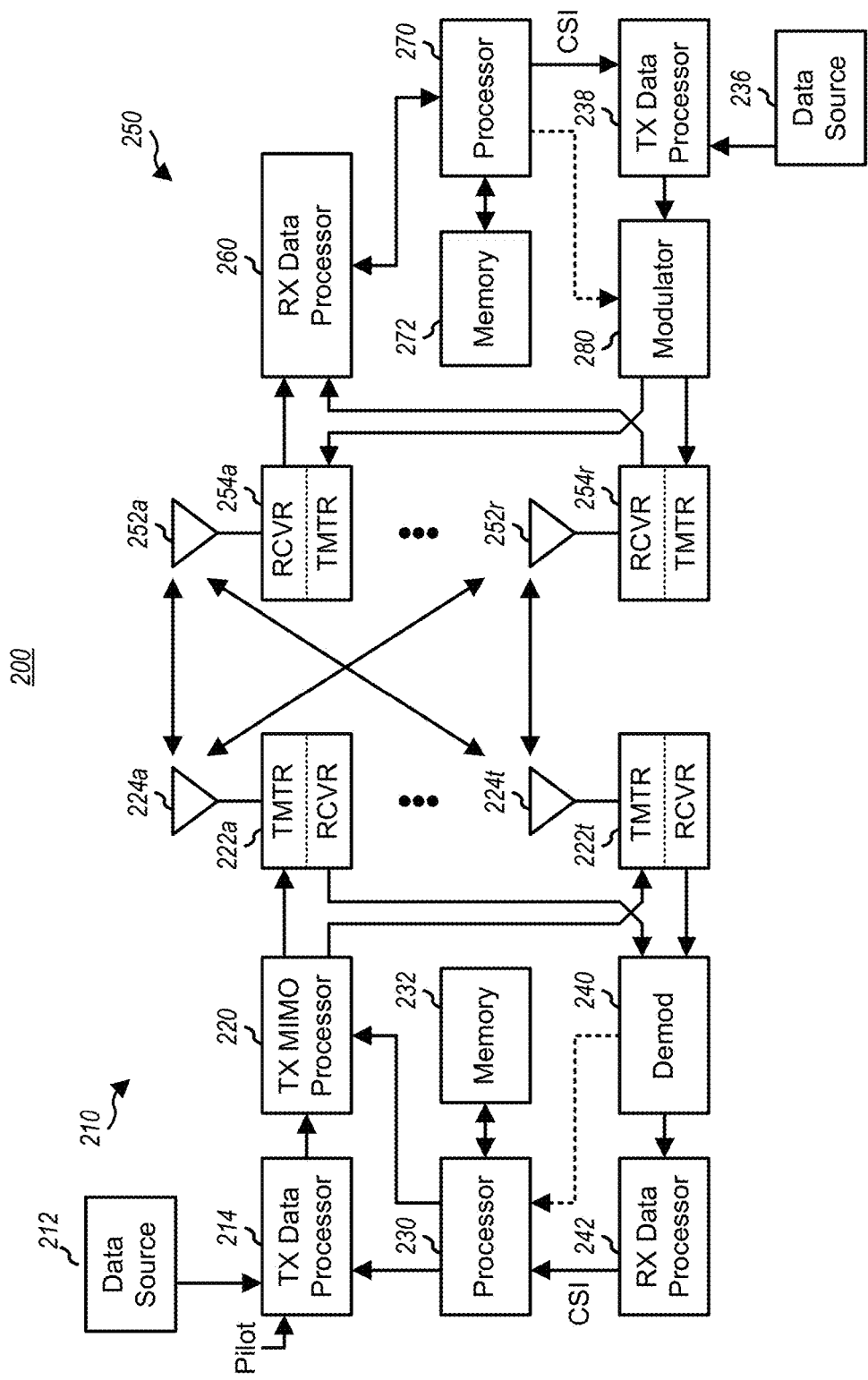
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
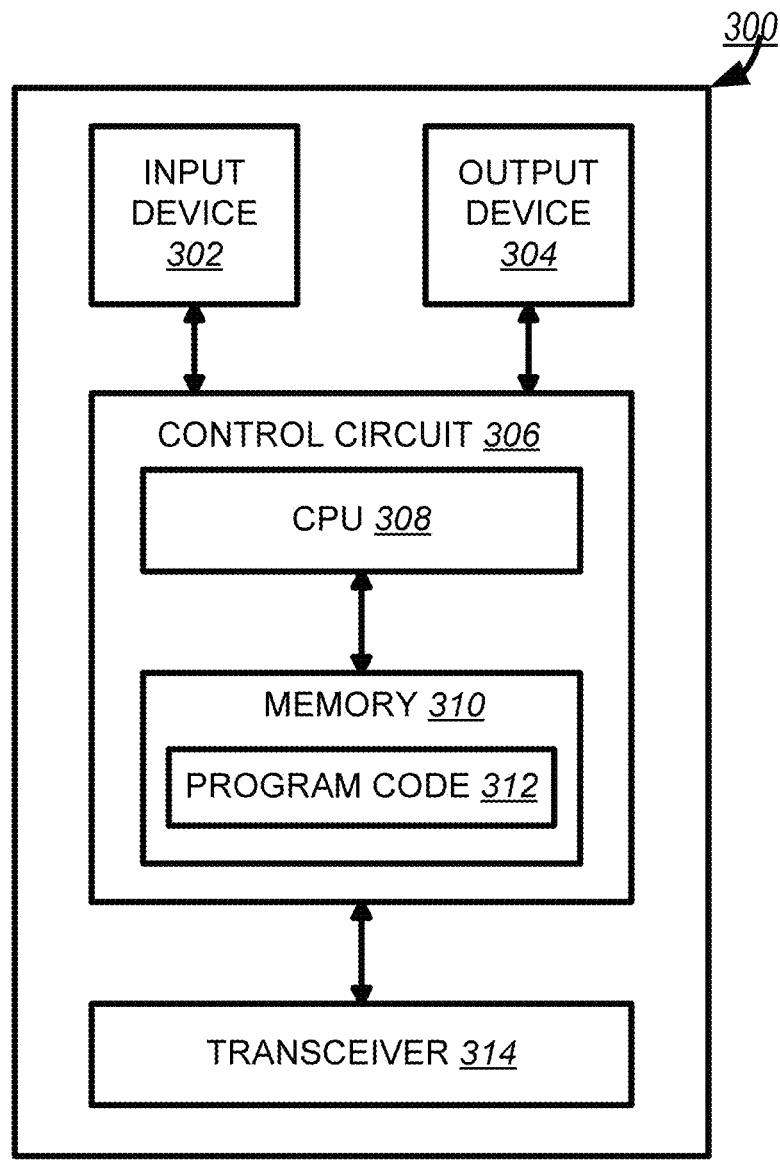
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
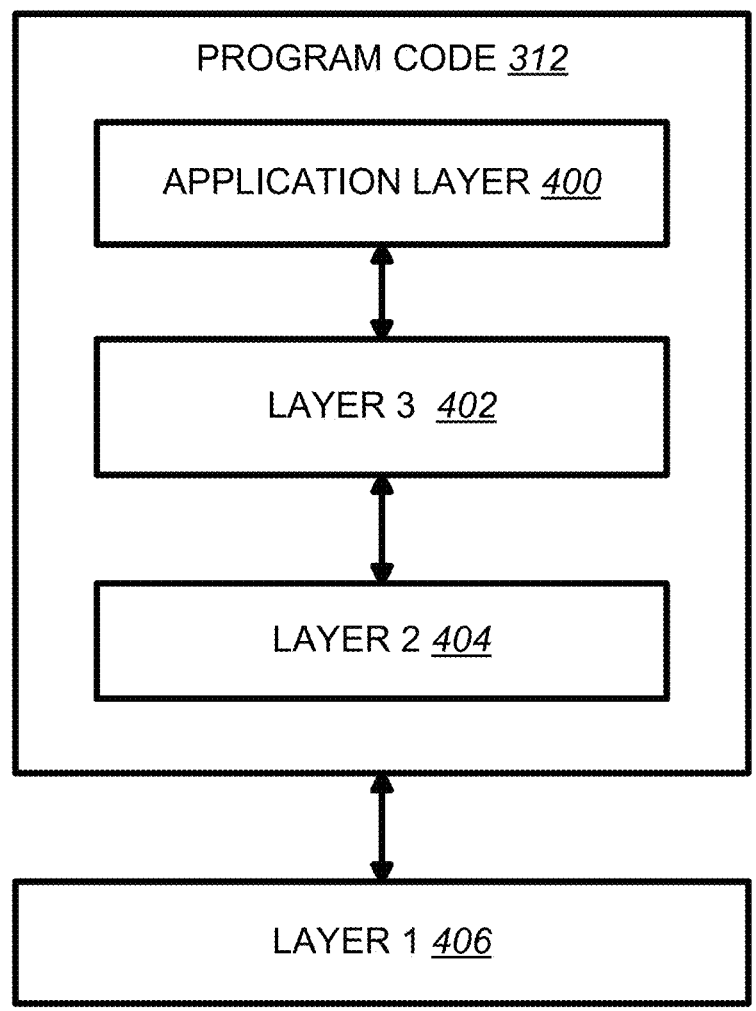
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

LTE in unlicensed spectrum, aka Licensed-Assisted Access (LAA), has been approved as 3GPP RP-151045. The goal is to study enhancements for LTE to operate in unlicensed spectrum in 5 GHz. While licensed spectrum remains 3GPP operators' top priority to deliver advanced services and user experience, the opportunistic use of unlicensed spectrum is becoming an important complement to meet the growing traffic demand. This feature can then become an attractive option for operators to make use of unlicensed spectrum with a unified network, offering potential operational cost saving, improved spectral efficiency and a better user experience. The objective of 3GPP RP-151045 is quoted as below:

4. Objective
4.1 Objective of SI or Core Part WI or Testing Part WI

This work item will specify LTE enhancements for a single global solution framework for licensed-assisted access to unlicensed spectrum which enables operation of LTE in the 5 GHz unlicensed spectrum for low power secondary cells based on regional regulatory power limits using carrier aggregation. Support for Dual Connectivity and standalone operation on unlicensed spectrum is therefore not included*. The core technology should be as much as possible band agnostic. The LAA design should allow fair coexistence between Wi-Fi and LAA and fair coexistence between different LAA systems. This shall be ensured by following the recommendations and conclusions from the TR on LAA and continuing to consider coexistence for the specification work [2]. In addition a minimum set of mandatory features/parameters that enables effective and fair coexistence between Wi-Fi and LAA and effective and fair coexistence between different LAA systems should be identified. To allow an effective design, the enhancements should reuse the features of LTE as much as possible. Duplication of work done in other LTE work items should be avoided.

For the LAA SCell, there is no support in BS or UE for transmission/reception of any current broadcasted system information, random access responses and paging (following LTE Carrier Aggregation procedure), including no corresponding rate matching.

The work item should only specify support for LAA SCells operating with only DL transmissions. When specifying support for LAA SCells with only DL transmission, the following for the UL should be agreed (but not specified): the principles of UL channel access and the necessary forward compatibility mechanism so that the UL for LAA SCells can be added in future release without modifications to the DL design.

The detailed objectives of the work item are to specify support for the following functionalities:
Channel access framework including clear channel assessment (RAN1, RAN2, RAN4)
Discontinuous transmission with limited maximum transmission duration (RAN1, RAN4)
UE support for carrier selection (RAN1, RAN2)
UE support for RRM measurements including cell identification (RAN1, RAN2, RAN4)
AGC, coarse and fine time and frequency synchronization (RAN1, RAN4)
Channel-State Information (CSI) measurement, including channel and interference (RAN1, RAN4)

The work item should also specify base station and UE core requirements of 5 GHz spectrum (based on regulatory limits) including applicable band/bands definition and a limited set of example band combinations. The 5 GHz band/bands definition should include DL only and UL/DL operations (without UL requirements being defined in Rel-13). The 5 GHz unlicensed band/bands definition(s) should not introduce new frame structure(s) (if any) and/or new TDD UL/DL configurations (if any) for the licensed bands. (RAN4)

Note: In Device Coexistence based on Release 11 is to be applied.

All agreements done by RAN1#82bis are listed in 3GPP R1-156386. For downlink transmission related agreements are quoted as below:

2.4 DL Transmissions
Agreements:
Support CRS-based and DMRS-based transmission schemes/modes in LAA
FFS whether and how to handle power fluctuation and discontinuous transmission
Agreements:
The following option is excluded for PDSCH transmission in a DL subframe on a LAA SCell
Option 2: A DL transport block is transmitted on a subset of the OFDM symbols in the DL subframe and all OFDM symbols in the next or the previous subframe (i.e. Super TTI)
Further study on the following options for PDSCH transmission in a DL subframe on a LAA SCell considering spectrum efficiency, eNB/UE complexity, etc
Option 1: A DL transport block is only transmitted on a subset or all of the OFDM symbols in the DL subframe (i.e. Partial TTI)
Option 3: A DL transport block is transmitted on a subset of OFDM symbols in the DL subframe and a subset of the OFDM symbols in the next or the previous subframe within a TTI less than or equal to 1 ms or in a subset or all OFDM symbols in one subframe (i.e. Floating TTI)
Working Assumption:
Transmission of DL subframes (or TTI) with CRS only in the first (first two) symbol(s) is supported in LAA
Note: CRS is present in 1/2 symbols when (1 or 2)/4 port CRS is configured
PDSCH mapping from the second symbol is allowed in such subframes (or TTI)
FFS restrictions to ensure fine synchronization. For e.g., first subframe (or TTI) in a DL transmission burst
FFS more CRS than in first two symbols to ensure fine synchronization
FFS configuration/signalling of such subframes (or TTI)
FFS: partial subframes
FFS: DRS subframes
Agreements:
Every subframe 0 and 5, when transmitted by the eNB, should contain Rel-12 PSS/SSS/CRS where PSS/SSS/CRS in the LAA DRS is a subset of these signals.

Number of CRS ports should be the same or higher than the number of CRS ports in the DRS.

FFS: Partial TTI in SF0 and SF5

FFS: Changes to scrambling for SSS/CRS

Note: A UE is only expected to detect and measure cells transmitting DRS during the configured DRS DMTC window (from RAN2 agreements)

The PSS/SSS/CRS in LAA DRS is a subset of Rel-12 PSS/SSS/CRS.

FFS: Changes to scrambling for SSS/CRS

Working Assumption:

Adopt one of the following options for achieving synchronization in addition to synchronization provided by DRS:

Option 1: Initial signal (SSS/PSS) is transmitted before the first data/control OFDM symbol of the DL transmission burst. 4 CRS-port 0 OFDM symbols are transmitted in at least the first subframe of DL transmission burst Option 2: 4 CRS-port 0 OFDM symbols are transmitted in a subframe Agreements:

Adopt one or some of the following options for detecting transmissions (except for partial subframe) from a serving cell:

Option 1: Initial signal (SSS/PSS) is transmitted before the first data/control OFDM symbol of the DL transmission burst Option 2: 1 CRS-port 0 (+1) OFDM symbols are transmitted in every subframe Option 3: Detecting (E)PDCCH when scheduled Agreements:

UE may assume that OFDM symbol#0 containing CRS-port 0+1 (or CRS-port 0) is transmitted in every subframe (FFS: for partial subframe) subject to LBT Note: "UE may" implies no intention to specify explicit UE procedure related to detecting tx burst according to the above Agreements:

DL transport block in the last subframe of a DL Tx burst can be transmitted using DwPTS structure, or a full subframe FFS how to signal the structure of the last subframe FFS whether to define a 13-symbol partial subframe FFS whether DwPTS structure with 3 OFDM symbols can be used for the last subframe FFS down selection Agreements:

UE may assume that the transmission power for CRS and CSI-RS in the DRS is constant for RRM measurements regardless of the subframe in which the DRS is transmitted within the DMTC Working Assumption:

UE may assume that the CRS and CSI-RS transmission has a constant power in each subframe of DL transmission burst, and the UE should not assume that the CRS and CSI-RS transmission power is the same across transmission bursts FFS: Whether there is any problem with AGC FFS: Whether there is an issue with CSI measurements due to potential mismatch in UE's measured subframe and eNB's understanding of the measured subframe FFS: How the UE identifies whether subframes belong to the same transmission burst Note: The following options and other potential options for such identification are not precluded.

Such identification is left up to UE implementation.

Such identification is provided via assistance from the eNB.

Figure 5:
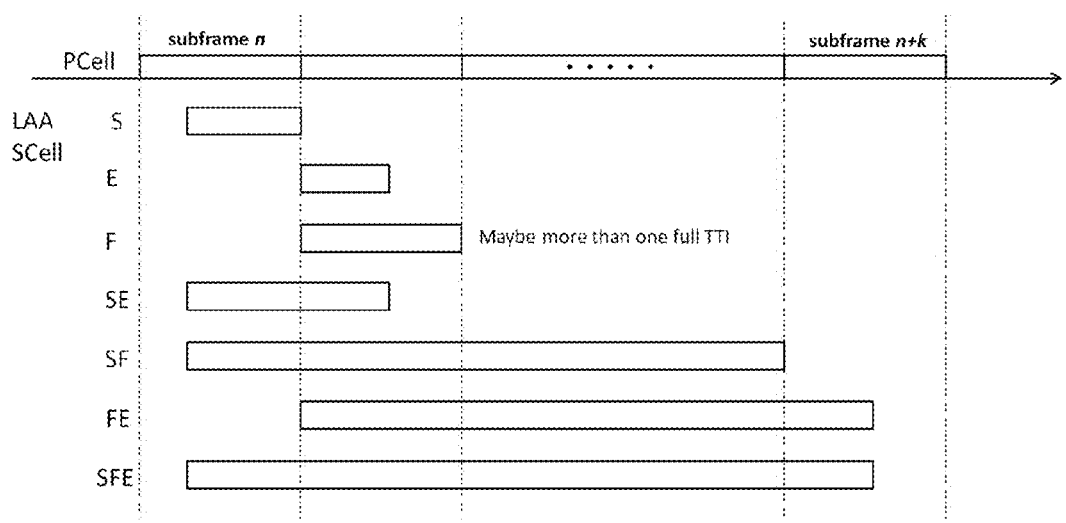
FIG. 5 illustrates LAA downlink transmission burst types.

Agreements:

TM1, TM2, TM3, TM4, TM8, TM9, and TM10 are supported on LAA SCell from RAN1 specification point of views TM10 supports at least QCL type A FFS: QCL type B PQI bits are still present in DCI format 2D Fallback transmission schemes are supported Note: There is a comment related to UE capability for TMs, and at least TM8, 9, 10 should be optional in Rel-13 as one of future RAN1 recommendations And a possible agreement as disclosed in 3GPP R1-156177 related to downlink transmission structure is quoted as below. From the possible agreement, 3 TTI structures are defined and thus 7 possible downlink transmission burst types are listed in FIG. 5. In FIG. 5, S implies Start partial TTI, F implies Full TTI, and E implies End partial TTI. For type F, the transmission burst consists of only full subframe and not limited to only one subframe. 3GPP R1-156177 provides:

In LAA SCell, a DL transport block should be transmitted on a subset or all of the OFDM symbols in the DL subframe Start symbol position for start partial TTI should be a subset of [4, 5, 8]-th OFDM symbols End symbol position for end partial TTI should be a subset of [3, 6, 9, 10, 11, 12]-th OFDM symbols FFS indication/detection of length of partial TTI FFS support of start partial TTI for cross-carrier scheduling case Note: TTI means time duration of eNB's transmission in a subframe excluding initial signal (e.g., preamble or reservation signal)

Full TTI consists of 14 OFDM symbols and partial TTI consists of less than 14 OFDM symbols in a subframe.

Start partial TTI consists of n-th (n>1) to 14-th OFDM symbols.

End partial TTI consists of first to m-th (m<14) OFDM symbols.

The following is a list of potential agreements on "Signaling in LAA DL subframes" as quoted below:

1/2 or 4/6 OFDM Symbol CRS (MBSFN or Non-MBSFN)

The following options have been identified to determine the subframe structure (MBSFN (1/2 symbol CRS) or non-MBSFN (4/6 symbol CRS))

Option 1: RRC Configuration

Option1-1: reusing the RRC configuration of MBSFN subframes

Option1-2: indicate whether all the subframes contain 4 CRS symbols or whether only subframes 0 and 5 only contain 4 CRS symbols.

Option 2: UE blind detection

Option 3: Dynamic signaling

Select one or more options in RAN1#83.

End Partial Subframe:

Signaling the presence of end DL partial subframes is supported in LAA.

FFS: Signaling method and frequency

Number of Expected DL Subframes (Starting from Current Subframe) in the Ongoing Transmission Burst The following options have been identified for signaling the number of expected DL subframes in each DL subframe in the ongoing transmission burst Option 1: No signaling is needed
Option 2: Signaling is carried in DL every subframe.
Option 3: Signaling is carried in a subset of DL subframes (e.g. last subframe)
FFS: Signaling method if signaling is adopted
Select one of the options in RAN1#83.
Number of Subframes after End of DL Transmission, or the Time Duration, During which UE Need not Detect Transmission, Monitor DCI and Perform CSI Measurements:
  Signaling the number of subframes after end of DL transmission, or the time duration, during which UE need not detect transmission, monitor DCI and perform CSI measurements can be further considered
  FFS candidate signaling methods that may be specified in a potential future WI
Presence of Periodic CSI-RS/CSI-IM:
  Signaling of the presence of periodic CSI-RS and CSI-IM transmission is not considered in LAA. For aperiodic CSI-RS and CSI-IM transmission, signaling can be considered after a decision on aperiodic CSI-RS/CSI-IM transmission for LAA in Rel-13.
  Decide whether aperiodic CSI-RS/CSI-IM transmission is allowed for LAA in Rel-13 in RAN1#83.
Signaling of CRS/CSI-RS Power Variation
  The following options have been identified for the signaling of CRS/CSI-RS power variation in LAA
  Option 1: No signaling is needed
  Option 2: Power variation between current CRS/CSI-RS power and reference CRS/CSI-RS power is signaled
    FFS: Signaling method
Select one of the options in RAN1#83
Presence of DRS for EPDCCH/PDSCH Rate Matching and CSI-RS/CSI-IM Presence
  If DRS can be multiplexed with PDSCH in subframes other than subframe 0 and 5, the following options have been identified for EPDCCH/PDSCH rate matching and CSI-RS/CSI-IM presence.
  Option 1: signaling the presence of DRS for EPDCCH/PDSCH rate matching and CSI-RS/CSI-IM presence is supported
    FFS: Signaling method
  Option 2: No signaling is needed
    Option 2-1: UE blind detection of DRS for rate matching
    Option 2-2: PDSCH is always rate matched around DRS within the DMTC window
  Decide if DRS can be multiplexed with PDSCH in subframes other than subframes 0 and 5, and if so select one of the options in RAN1#83.

This disclosure focuses on two potential agreements which indicate the downlink transmission burst type. They are "End Partial Subframe" and "Number of expected DL subframes (starting from current subframe) in the ongoing transmission burst." Many companies provide their proposals (i.e., 3GPP R1-156767, R1-157224, R1-156988, and R1-156169) on the first potential agreement. Basically, these solutions suggest providing a signaling to indicate the number of OFDM symbols of corresponding subframe either in every subframe or in the end subframe of a downlink transmission burst. These proposals are listed below:
3GPP R1-156767
Proposal 2: The number of OFDM symbols for DL {3, 6, 9, 10, 11, 12, 14} is indicated using DCI format 1C scrambled with eIMTA RNTI or a new RNTI. The common signalling can be transmitted in every subframe. If control signaling overhead reduction is desirable, the signalling may be transmitted in the last subframe of the transmission burst.

Proposal 3: If the current DL subframe is indicated to be 14 OFDM symbols, the number of DL OFDM symbols of the next subframe (including zero, i.e. {0, 3, 6, 9, 10, 11, 12, 14}) is also signaled to the UE.
3GPP R1-157224
Proposal 1: A new common signaling should be supported to carry at least following information.
  Ending partial subframe structure
  Burst index indication
  Presence of aperiodic CSI-RS/IM
    Table 2-1: Possible contents for the common signaling (Table 1 in Figure section)
3GPP R1-156988
  . . . For example, the set of the number of OFDM symbols for the ending subframe is {3, 6, 7, 9, 10, 11, 12, 14}. "3" OFDM symbols for ending partial subframe could be used for UL grant while "14" represents a full subframe. Three bits can be used to indicate the number of OFDM symbols for the ending subframe . . . .
Proposal 2: The number of OFDM symbols of ending partial subframe should be signaled by DCI in each subframe.
3GPP R1-156169
Proposal 3: The number of OFDM symbols for a Type 3 subframe is suggested to be chosen from the set S={3, 6, 9, 10, 11, 12, 13, 14}.
Proposal 4: We suggest to signaling the number of OFDM symbols in each DL TTI to provide a unified solution and also minimize receiver complexity The disclosure of the embodiments disclosed herein makes two assumptions on the signaling method. As shown in FIG. 5, the signaling may include up to seven parameters to indicate difference subframe structures. If some parameters are only sent in the end subframe and some parameters are sent in every subframe, then the signaling most likely needs to define more than one signaling format, which increases complexity for a UE to decode the signaling. Thus, the first assumption is that the subframe structure is indicated in every subframe rather than only in the end subframe. As to the number of expected DL subframe, the embodiments disclosed herein provides a solution to detect the end subframe of a downlink transmission burst. Thus, the second assumption is no signaling is needed for "the number of expected DL subframes".

According to the background 3GPP agreements, the "UE may assume that OFDM symbol#0 containing CRS-port 0+1 (or CRS-port 0) is transmitted in every subframe (FFS: for partial subframe) subject to LBT", the UE can determine whether a subframe (at least for full subframe) is a LAA downlink subframe by checking CRS at OFDM symbol#0. However, if there is explicit signaling indicating a subframe is an end subframe, this will reduce computations because there will be no need to check CRS at OFDM symbol#0 in the next subframe and also improve reliability. In addition, for channel estimation purpose, if the UE can determine whether the current subframe is an end subframe, the UE can also determine if the next subframe is available for channel interpolation, rather than having to wait until the detection result of the OFDM symbol#0 of the next subframe. Thus, the various embodiments disclosed herein are directed to efficiently indicating the end of a subframe.

Figure 7:
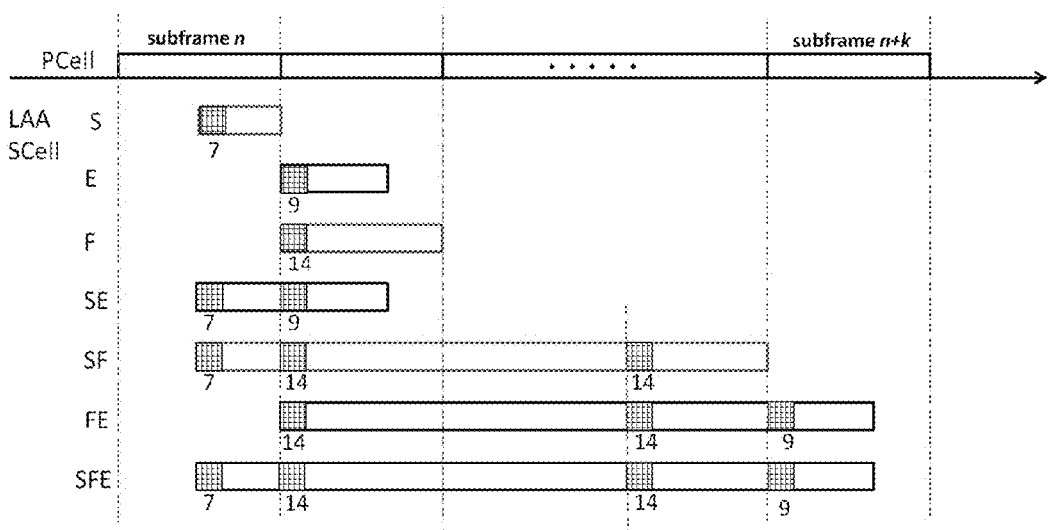
FIG. 7 illustrates signaling the number of OFDM symbols.

According to 3GPP background documents, when the signaling (e.g., the number of OFDM symbols of corresponding subframes) is applied to every subframe of the downlink transmission bursts shown in FIG. 5, the results are shown in FIG. 7. For types E, SE, FE, and SFE, when a UE decodes the signaling it can determine that the subframe is an end partial subframe. The UE is also able to determine that the subframe is also the end subframe of the ongoing downlink transmission burst because of the end partial subframe definition mentioned in the background part.

With the signaling and without combining any other signaling or detection mechanism, regarding to types S, the UE can determine that the subframe is a start partial subframe because of the start partial subframe definition, but the UE does not know whether this subframe is also an end subframe. Similarly, regarding the end subframe of type F and SF, the UE can determine that the subframe is a full subframe, but the UE will fail to recognize it is also an end subframe. According to the various embodiments disclosed herein, methods for efficiently indicating whether the current subframe is the end subframe of ongoing downlink transmission burst.

According to the various embodiments, a value is reserved in the signaling (by way of example and not of limitation, indicating the number of OFDM symbols of corresponding subframe) to indicate that a subframe is an end subframe. Specifically, the signaling can use 4-bits to indicate at most 16 OFDM symbols while a full subframe consists of 14 OFDM symbols. A value which is larger than 14, e.g. 15, thus can be a reserved value.

Figure 8:
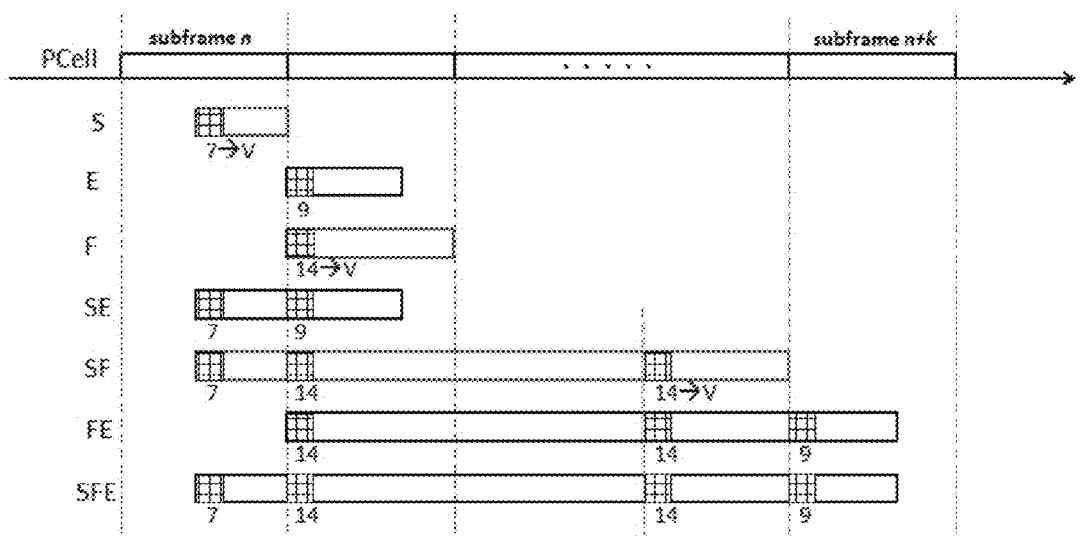
FIG. 8 illustrates signaling the number of OFDM symbols and the end subframe flag according to one exemplary embodiment.

In one embodiment, if a subframe is a full subframe and also an end subframe, the signaling will use a reserved value or pre-defined value, V, to replace 14 in type F and SF, as shown in FIG. 8. UE knows that a subframe is a full subframe and also an end subframe because it successfully decodes the subframe from the subframe boundary and the signaling is V.

In another embodiment, if a subframe is a start partial subframe and also an end subframe, the signaling will use a reserved value or pre-defined value, V, to replace the number of OFDM symbols in type S in FIG. 8. Since the start symbol positions are predefined, the UE will always know the length of the start partial subframe once it successfully decodes the LAA start partial subframe according to some reservation/initial signaling detection and PDCCH/CRS detection. Therefore, the number of OFDM symbols to the start partial subframe is less meaningful. Rather, the reserved value provides the end subframe flag for the UE to determine the validity of next subframe.

According to the various embodiments disclosed herein, an information is defined to determine whether a subframe is the end subframe of a downlink transmission burst in a first channel, wherein the information is sent in a second channel in the subframe. In other embodiments, the information is an identifier in which a value of the identifier is a bit string.

In one alternative embodiment, the first channel is an unlicensed channel. The downlink transmission burst can be a continuous transmission from a base station with no transmission immediately before or after from the base station on the first unlicensed channel.

In the various embodiments, the value of the identifier is the number of OFDM symbols in the subframe if the subframe is an end partial subframe of the downlink transmission burst, wherein the end partial subframe consists of first to N-th OFDM symbols, wherein N is a value less than 14. Alternatively, the value of the identifier is the number of OFDM symbols if the subframe is a full subframe and the subframe is not the end subframe of the downlink transmission burst, wherein the full subframe consists of 14 OFDM symbols.

In some embodiments, a pre-defined value of the identifier indicates the subframe is the full subframe and the subframe is the end subframe of the downlink transmission burst. In other embodiments, the pre-defined value of the identifier indicates the subframe is a start partial subframe and the subframe is the end subframe of the downlink data transmission burst, wherein the start partial subframe consists of M-th to 14-th OFDM symbols, wherein M is a value larger than 1.

In above-disclosed embodiments, the first channel is a Physical Downlink Share Channel (PDSCH). The second channel can be a Physical Downlink Control Channel (PDCCH), Physical HARQ Indicator Channel (PHICH), or a Physical Control Format Indicator Channel (PCFICH).

According to one exemplary method for a UE to perform data reception in a wireless communication system, the UE receives information from a base station in a subframe N. The UE determines not to receive a control message, data, and reference signal from the next subframe N+1 in the first unlicensed channel if the information indicates the subframe N is the end subframe of the downlink transmission burst. Alternatively, the UE determines to receive a control message, data, and reference signal from the next subframe N+1 in the first unlicensed channel if the information indicates the subframe N is not the end subframe of the downlink transmission burst.

Figure 9:
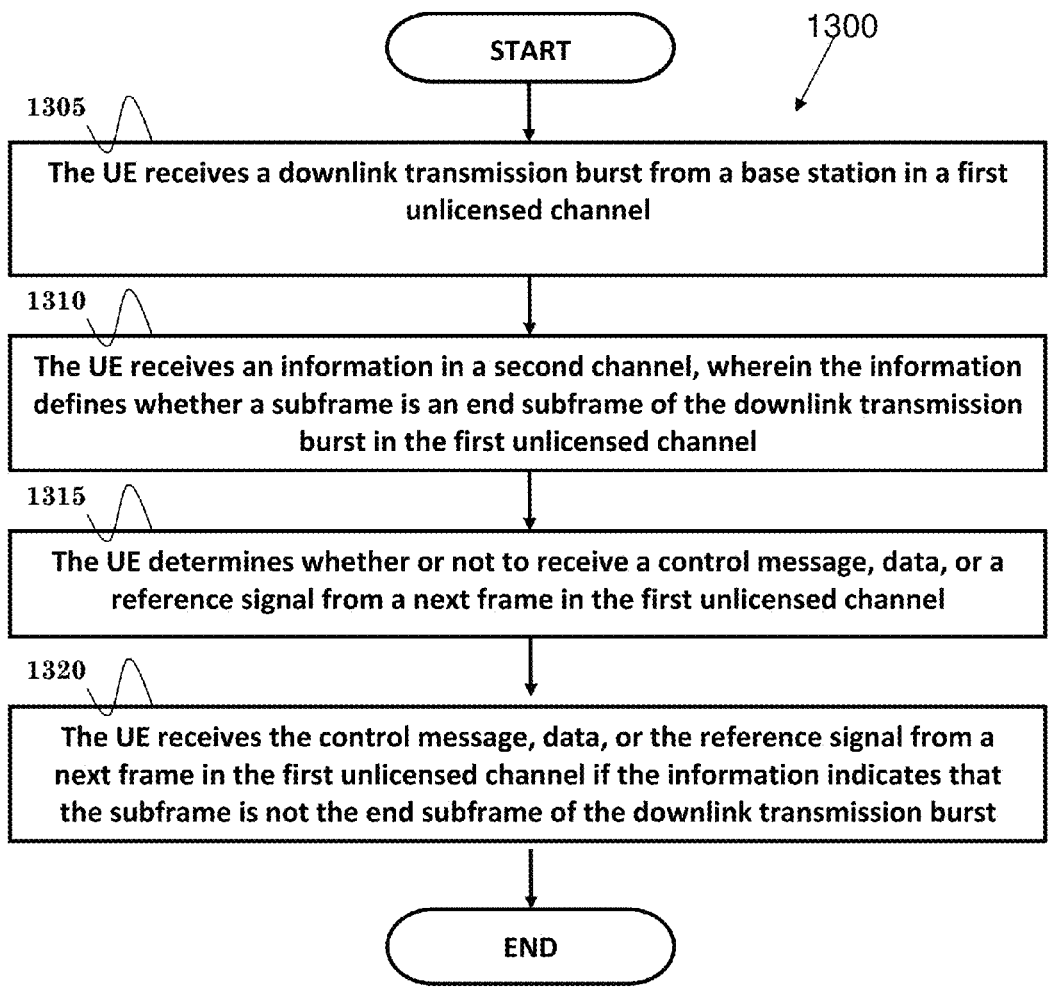
FIG. 9 is a flow diagram according to one exemplary embodiment.

FIG. 9 is a flow chart 1300 according to one exemplary embodiment. In step 1305, the UE receives a downlink transmission burst from a base station in a first unlicensed channel. In step 1310, the UE receives an information in a second channel, wherein the information defines whether a subframe is an end subframe of the downlink transmission burst in the first unlicensed channel. In step 1315, the UE determines whether or not to receive a control message, data, or a reference signal from a next frame in the first unlicensed channel. In step 1320, the UE receives the control message, data, or the reference signal from the next frame in the first unlicensed channel if the information indicates that the subframe is not the end subframe of the downlink transmission burst.

Figure 10:
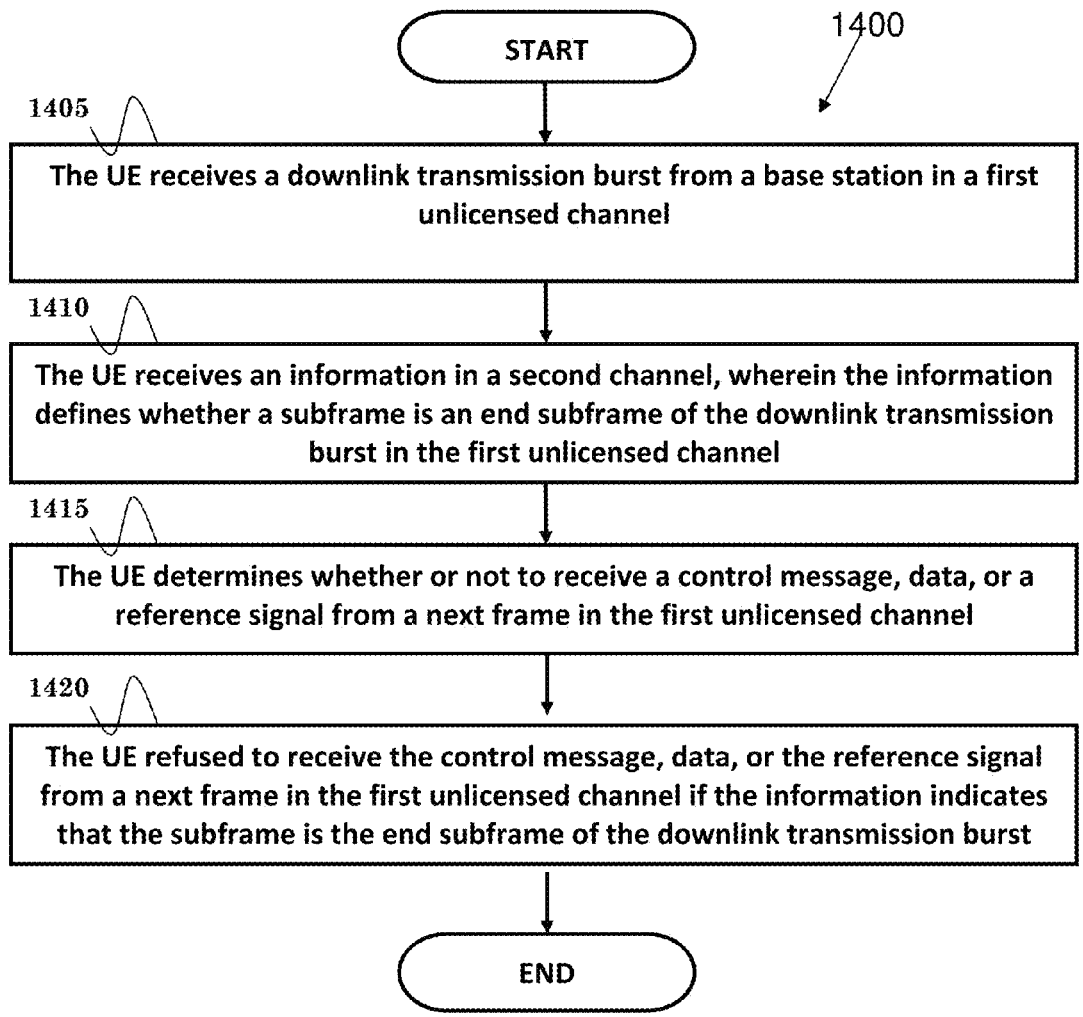
FIG. 10 is a flow diagram according to one exemplary embodiment.
Figure 9:
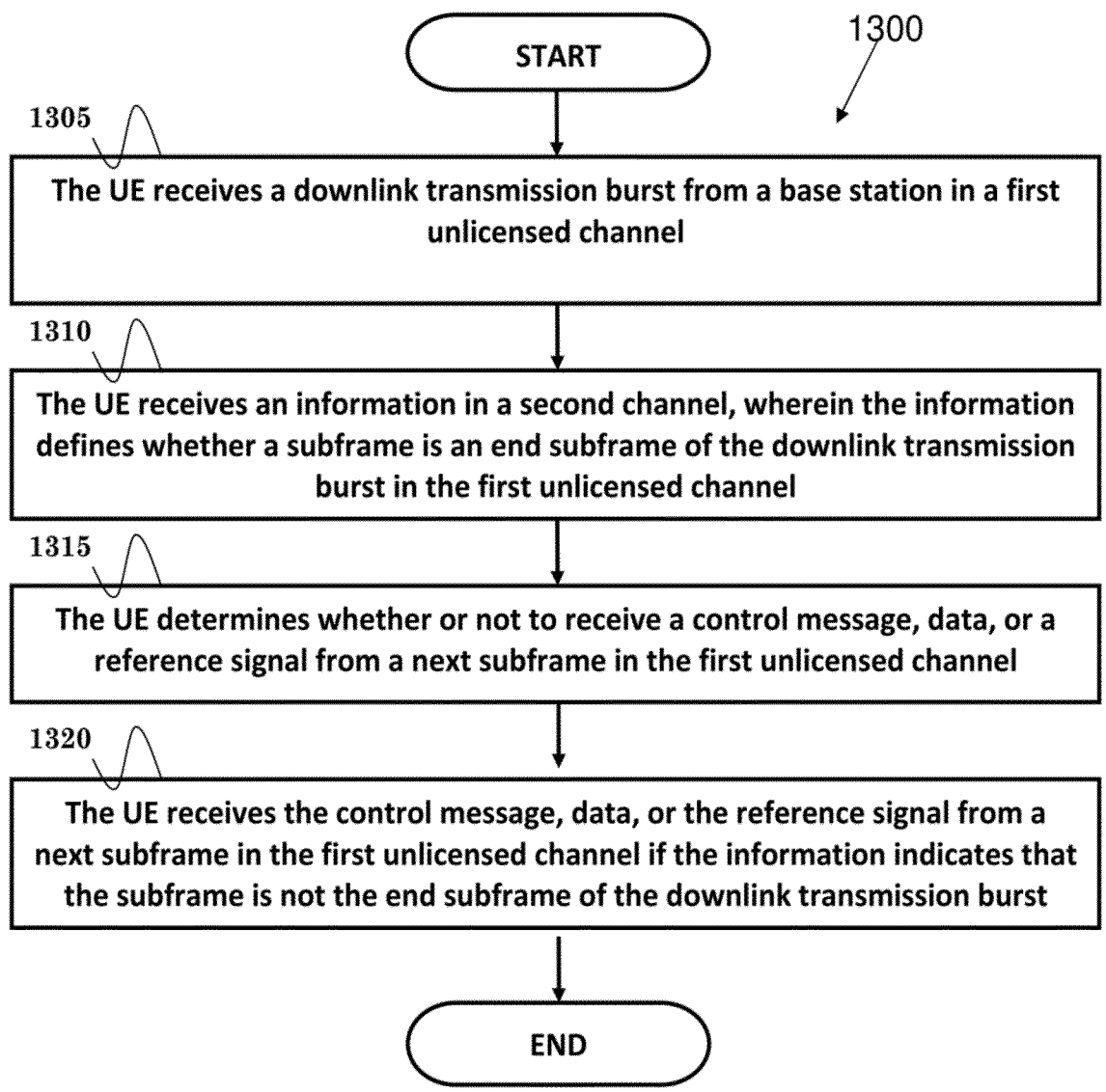
Figure 10:
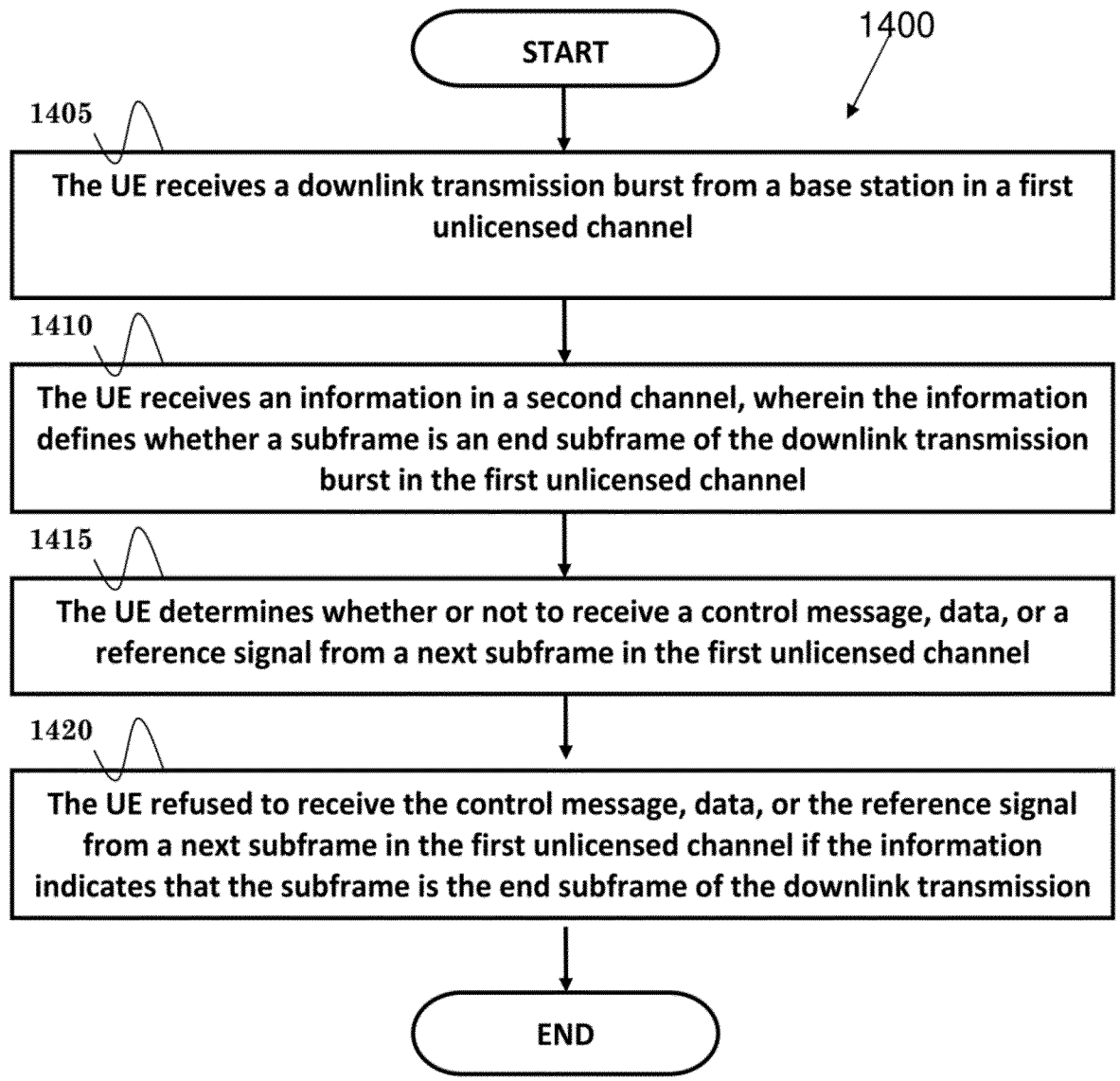

FIG. 10 is a flow chart 1400 according to one exemplary embodiment. In step 1405, the UE receives a downlink transmission burst from a base station in a first unlicensed channel. In step 1410, the UE receives an information in a second channel, wherein the information defines whether a subframe is an end subframe of the downlink transmission burst in the first unlicensed channel. In step 1415, the UE determines whether or not to receive a control message, data, or a reference signal from a next frame in the first unlicensed channel. In step 1420, the UE refuses to receive the control message, data, or the reference signal from the next frame in the first unlicensed channel if the information indicates that the subframe is the end subframe of the downlink transmission burst.

In another aspect, according to one exemplary method for a base station to perform data transmission in a wireless communication system, the base station constructs the information for the subframe based on whether the subframe is the end subframe of the downlink transmission burst and based on the number of OFDM symbols of the subframe. The base station then ends the information in the second channel.

Referring back to FIGS. 3 and 4, in one embodiment from the perspective of a UE, the device 300 includes a program code 312 stored in memory 310. The CPU 308 could execute program code 312 to enable the UE (i) to receive information from a base station in a subframe. In one embodiment, the CPU could further execute program code 312 to enable the UE to determine whether or not to receive a control message, data, or a reference signal depending on whether the information indicates whether the subframe is or is not the end subframe of the downlink transmission burst. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

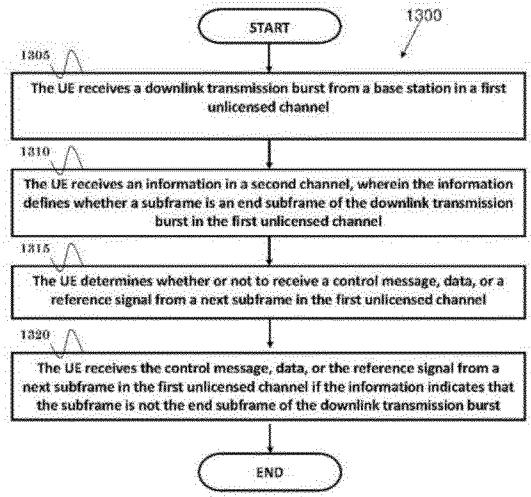

The invention claimed is:

1. A method for a user equipment (UE) to perform data reception using unlicensed channels in a wireless communication system, the method comprising:
   receiving, by the UE, a downlink transmission burst from a base station in a first unlicensed channel;
   receiving, by the UE, an information in a second channel, wherein the information defines whether a subframe is an end subframe of the downlink transmission burst in the first unlicensed channel;
   determining, by the UE, whether or not to receive a control message, data, or a reference signal from a next frame in the first unlicensed channel; and
   receiving, by the UE, the control message, data, or the reference signal from the next frame in the first unlicensed channel if the information indicates that the subframe is not the end subframe of the downlink transmission burst.

2. The method of claim 1, wherein the downlink transmission burst is a continuous transmission from the base station with no transmission immediately before or after from the base station on the first unlicensed channel.

3. The method of claim 1, wherein the information is an identifier, wherein a value of the identifier is a bit string.

4. The method of claim 3, wherein the value of the identifier is the number of OFDM symbols in the subframe if the subframe is an end partial subframe of the downlink transmission burst, wherein the end partial subframe consists of first to N-th OFDM symbols, wherein N is a value less than 14.

5. The method of claim 3, wherein the value of the identifier is the number of OFDM symbols if the subframe is a full subframe and the subframe is not the end subframe of the downlink transmission burst, wherein the full subframe consists of 14 OFDM symbols.

6. The method of claim 3, wherein a pre-defined value of the identifier indicates the subframe is the full subframe and the subframe is the end subframe of the downlink transmission burst.

7. The method of claim 6, wherein the pre-defined value of the identifier indicates the subframe is a start partial subframe and the subframe is the end subframe of the downlink data transmission burst, wherein the start partial subframe consists of M-th to 14-th OFDM symbols, wherein M is a value larger than 1.

8. The method of claim 1, wherein the first unlicensed channel is a Physical Downlink Share Channel (PDSCH).

9. The method of claim 1, wherein the second channel is a Physical Downlink Control Channel (PDCCH), Physical HARQ Indicator Channel (PHICH), or Physical Control Format Indicator Channel (PCFICH).

10. A method for a user equipment (UE) to perform data reception using unlicensed channels in a wireless communication system, the method comprising:
receiving, by the UE, a downlink transmission burst from a base station in a first unlicensed channel;
receiving, by the UE, an information in a second channel, wherein the information defines whether a subframe is an end subframe of the downlink transmission burst in the first unlicensed channel;
determining, by the UE, whether or not to receive a control message, data, or a reference signal from a next frame in the first unlicensed channel; and
refusing to receive, by the UE, the control message, data, or the reference signal from the next frame in the first unlicensed channel if the information indicates that the subframe is the end subframe of the downlink transmission burst.

11. The method of claim 10, wherein the downlink transmission burst is a continuous transmission from a base station with no transmission immediately before or after from the base station on the first unlicensed channel.

12. The method of claim 10, wherein the information is an identifier, wherein a value of the identifier is a bit string.

13. The method of claim 12, wherein the value of the identifier is the number of OFDM symbols in the subframe if the subframe is an end partial subframe of the downlink transmission burst, wherein the end partial subframe consists of first to N-th OFDM symbols, wherein N is a value less than 14.

14. The method of claim 12, wherein the value of the identifier is the number of OFDM symbols if the subframe is a full subframe and the subframe is not the end subframe of the downlink transmission burst, wherein the full subframe consists of 14 OFDM symbols.

15. The method of claim 12, wherein a pre-defined value of the identifier indicates the subframe is the full subframe and the subframe is the end subframe of the downlink transmission burst.

16. The method of claim 15, wherein the pre-defined value of the identifier indicates the subframe is a start partial subframe and the subframe is the end subframe of the downlink data transmission burst, wherein the start partial subframe consists of M-th to 14-th OFDM symbols, wherein M is a value larger than 1.

17. The method of claim 1, wherein the first unlicensed channel is a Physical Downlink Share Channel (PDSCH).

18. The method of claim 1, wherein the second channel is a Physical Downlink Control Channel (PDCCH), Physical HARQ Indicator Channel (PHICH), or Physical Control Format Indicator Channel (PCFICH).

19. A User Equipment (UE) to perform data reception using unlicensed channels in a wireless communication system, the UE comprising:
a control circuit;
a processor installed in the control circuit; and
a memory installed in the control circuit and operatively coupled to the processor;
wherein the processor is configured to execute a program code stored in the memory to:
receive a downlink transmission burst from a base station in a first unlicensed channel;
receive an information in a second channel, wherein the information defines whether a subframe is an end subframe of the downlink transmission burst in the first unlicensed channel;
determine whether or not to receive a control message, data, or a reference signal from a next frame in the first unlicensed channel; and
receive the control message, data, or the reference signal from the next frame in the first unlicensed channel if the information indicates that the subframe is not the end subframe of the downlink transmission burst.

* * * * *

UNITED STATES PATENT AND TRADEMARK OFFICE
CERTIFICATE OF CORRECTION

PATENT NO. : 10,015,783 B2
APPLICATION NO. : 15/347282
DATED : July 3, 2018
INVENTOR(S) : Yin et al.

Page 1 of 4

It is certified that error appears in the above-identified patent and that said Letters Patent is hereby corrected as shown below:

On the Title Page

Delete the title page and substitute therefore with the attached title page consisting of the corrected illustrative figure In the Drawings Please replace FIGS. 9 and 10 with FIGS. 9 and 10 as shown on the attached pages In the Specification Column 12, Line 32, please replace "frame" with --subframe--
Column 12, Line 35, please replace "frame" with --subframe--
Column 12, Line 46, please replace "frame" with --subframe--
Column 12, Line 59, please replace "frame" with --subframe--

In the Claims

Column 14, Line 65, please replace "frame" with --subframe--
Column 14, Line 67, please replace "frame" with --subframe--
Column 15, Line 48, please replace "frame" with --subframe--
Column 15, Line 50, please replace "frame" with --subframe--
Column 16, Line 43, please replace "frame" with --subframe--
Column 16, Line 51, please replace "frame" with --subframe--

Signed and Sealed this
Second Day of June, 2020

Andrei Iancu
*Director of the United States Patent and Trademark Office*

(12) United States Patent
Yin et al.

(10) Patent No.: US 10,015,783 B2
(45) Date of Patent: Jul. 3, 2018

(54) METHOD AND APPARATUS FOR SIGNALLING TO DOWNLINK TRANSMISSION FOR UNLICENSED CHANNELS IN A WIRELESS COMMUNICATION SYSTEM

(71) Applicant: ASUSTeK Computer Inc., Taipei (TW)

(72) Inventors: Wei-Ming Yin, Taipei (TW); Li-Chih Tseng, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 112 days.

(21) Appl. No.: 15/347,282

(22) Filed: Nov. 9, 2016

(65) Prior Publication Data
US 2017/0142693 A1 May 18, 2017

Related U.S. Application Data

(60) Provisional application No. 62/255,746, filed on Nov. 16, 2015.

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1893* (2013.01); *H04L 5/0007* (2013.01); *H04W 16/14* (2013.01)

(58) Field of Classification Search
None
See application file for complete search history.

(56) References Cited

U.S. PATENT DOCUMENTS

2017/0332379 A1* 11/2017 Wang ............... H04W 72/0453
2017/0353866 A1* 12/2017 Gou ..................... H04W 16/14

OTHER PUBLICATIONS

Intel Corporation: "On the LAA DL Signaling", 3GPP DRAFT; R1-156516, 3rd Generation Partnership Project (3GPP), Mobile Competence Centre ; 650, Route Des Lucioles ; F-06921 Sophia-Antipolis Cedex ;France,vol. RAN WG1, no. XP051039874.

(Continued)

*Primary Examiner* — Anh Ngoc M Nguyen
(74) *Attorney, Agent, or Firm* — Blue Capital Law Firm, P.C.

(57) ABSTRACT

Methods and apparatuses for implementing reference signal transmissions in a wireless communication system. According to one method, the UE receives a downlink transmission burst from a base station in a first unlicensed channel. The UE also receives an information in a second channel, wherein the information defines whether a subframe is an end subframe of the downlink transmission burst in the first unlicensed channel. The UE determines whether or not to receive a control message, data, or a reference signal from a next frame in the first unlicensed channel. The UE receives the control message, data, or the reference signal from the next frame in the first unlicensed channel if the information indicates that the subframe is not the end subframe of the downlink transmission burst. Alternatively, the UE refuses to receive the control message, data, or the reference signal from the next frame in the first unlicensed channel if the information indicates that the subframe is the end subframe of the downlink transmission burst.

19 Claims, 10 Drawing Sheets